(12) United States Patent
Zhou

(10) Patent No.: US 10,824,732 B1
(45) Date of Patent: Nov. 3, 2020

(54) SYSTEM AND METHOD FOR PROTECTING FIRMWARE OF BASEBOARD MANAGEMENT CONTROLLER OF COMPUTING DEVICE

(71) Applicant: HONGFUJIN PRECISION ELECTRONICS (TIANJIN) CO., LTD., Tianjin (CN)

(72) Inventor: Xiao-Long Zhou, Tianjin (CN)

(73) Assignee: HONGFUJIN PRECISION ELECTRONIC (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 16/398,752

(22) Filed: Apr. 30, 2019

(30) Foreign Application Priority Data

Apr. 22, 2019 (CN) .......................... 2019 1 0324816

(51) Int. Cl.
*G06F 13/42* (2006.01)
*G06F 21/57* (2013.01)
*G06F 8/65* (2018.01)

(52) U.S. Cl.
CPC .............. *G06F 21/572* (2013.01); *G06F 8/66* (2013.01); *G06F 13/4282* (2013.01)

(58) Field of Classification Search
CPC ........................... G06F 21/572; G06F 13/4282
See application file for complete search history.

(56) References Cited

U.S. PATENT DOCUMENTS

| 10,585,816 | B1 * | 3/2020 | Lambert | ............. G06F 13/4282 |
| 2018/0322012 | A1 * | 11/2018 | Sharma | ............... G06F 11/3612 |
| 2019/0073478 | A1 * | 3/2019 | Khessib | ................ G06F 9/4401 |

* cited by examiner

Primary Examiner — Lewis A Bullock, Jr.
Assistant Examiner — Mohammad H Kabir
(74) Attorney, Agent, or Firm — ScienBiziP, P.C.

(57) ABSTRACT

A system and method for protecting firmware of baseboard management controller (BMC) includes a serial peripheral interface read only memory device (SPI ROM) and a logic controlling unit. The SPI ROM includes first and second blocks, the first block stores a main program, and the second block stores backup program. The logic controlling unit includes a protecting module, a determining module, and a controlling module. The protecting module write-protects the main program and the backup program of the SPI ROM. The determining module determines whether the main program of the first block is altered or damaged when the main program is obtained by the BMC. If so, the controlling module invokes the backup program from the second block, and writes the backup program to the first block. A firmware protecting method is also provided.

12 Claims, 4 Drawing Sheets

SYSTEM AND METHOD FOR PROTECTING FIRMWARE OF BASEBOARD MANAGEMENT CONTROLLER OF COMPUTING DEVICE

FIELD

The subject matter herein generally relates to firmware of baseboard management controller of computing device.

BACKGROUND

A baseboard management controller (BMC) is a specialized service processor that monitors a physical state of a computing device. The BMC is usually contained in a motherboard or main circuit board of the computing device being monitored. If firmware of the BMC is damaged for some reason, the BMC will not work properly. A protection of the BMC against damages is desired.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
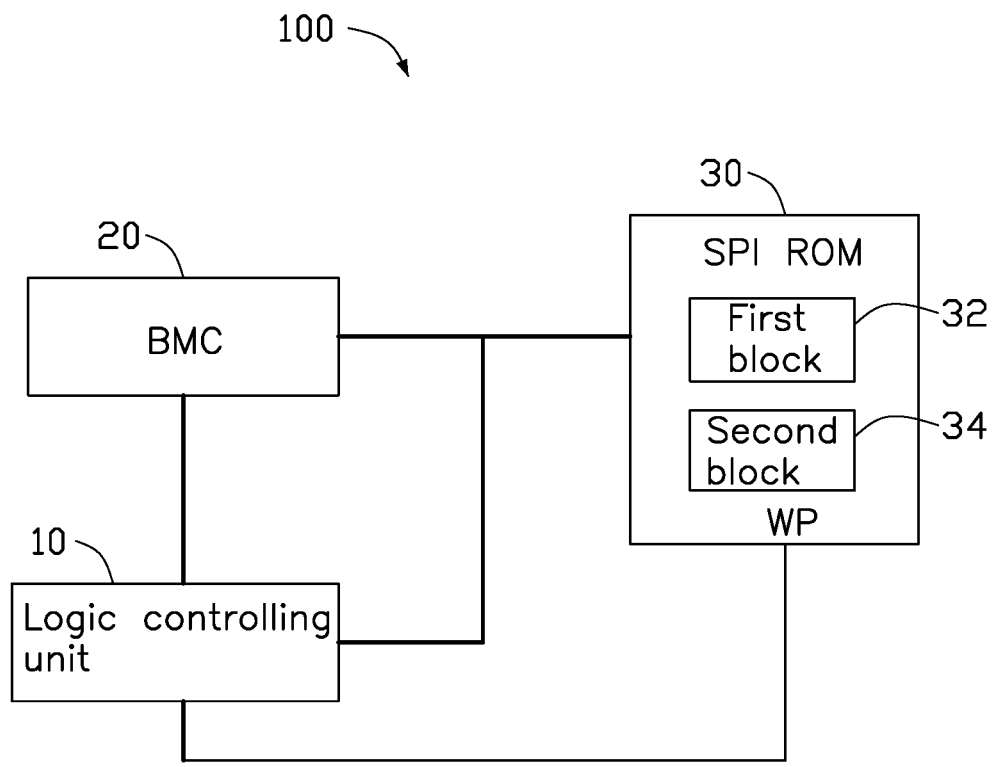
FIG. 1 is a block diagram of an embodiment of a firmware protecting system of a baseboard management controller of a computing device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a firmware protecting system 100 in accordance with an embodiment of the present disclosure. The firmware protecting system 100 operates in a computing device (not shown). In one embodiment, the computing device may be a computer, a server, or other hardware device.

The firmware protecting system 100 includes a logic controlling unit 10, a baseboard management controller (BMC 20), and a serial peripheral interface read only memory device (SPI ROM 30). In one embodiment, the logic controlling unit 10 may be a complex programmable logic device (CPLD).

In the embodiment, the BMC 20 is electrically coupled to the SPI ROM 30, and the logic controlling unit 10 is electrically coupled between the SPI ROM 30 and the BMC 20. The SPI ROM 30 is in communication with the BMC 20, and the logic controlling unit 10 is in communication with the SPI ROM 30 and the BMC 20.

In one embodiment, the logic controlling unit 10 can communicate with the SPI ROM 30 through an SPI bus.

In the embodiment, the SPI ROM 30 includes a first block 32 and a second block 34.

The first block 32 stores a main program. The second block 34 stores a backup program, which is identical to the main program stored in the SPI ROM 30. The BMC 20 obtains the main program from the first block 32, and loads the main program to work normally. The backup program can recover the main program when the main program of the SPI ROM 30 is not altered or damaged, to allow the BMC to work normally.

In the embodiment, the SPI ROM 30 further includes a write protection pin WP, and the write protection pin WP of the SPI ROM 30 is active when in a low state (such as logic 0). The low level signal thus prevents the SPI ROM 30 from being overwritten.

Figure 2:
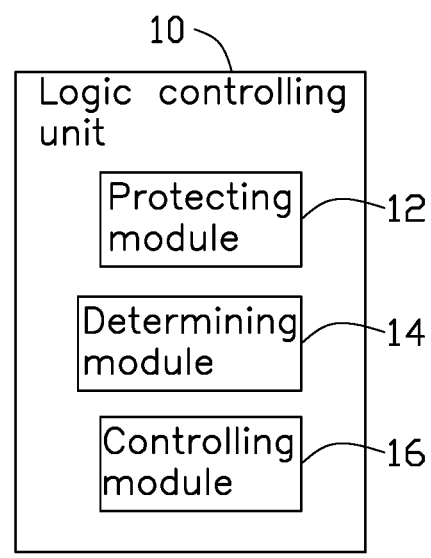
FIG. 2 is a block diagram of an embodiment of a logic controlling unit of the system of FIG. 1.

FIG. 2 illustrates that the logic controlling unit 10 includes a protecting module 12, a determining module 14, and a controlling module 16.

When the computing device is powered on, the protecting module 12 will lock the main program and the backup program into write-protected mode in the SPI ROM 30.

For example, when a server is powered on, the protecting module 12 sends a write protection command to the SPI ROM 30, and the main program and the backup program are locked according to the write protection command. Therefore, the SPI ROM 30 can only read data, and the main program and the backup program are protected against alteration.

The protecting module 12 sets a potential of the write protection pin WP of the SPI ROM 30 to a low level state, to write-protect the main program and the backup program in the SPI ROM 30.

After the logic controlling unit 10 write-protects the SPI ROM 30, the logic controlling unit 10 outputs a signal fed back to the BMC 20, and the BMC 20 will obtain the main program from the first block 32 of the SPI ROM 30 to perform work.

Furthermore, the determining module 14 determines whether the main program is altered or damaged when the main program is obtained.

If the BMC 20 can successfully load the main program, and the main program is not altered or damaged, the controlling module 16 sends a deep sleep command to the SPI ROM 30. At this time, the SPI ROM 30 cannot be read from or written to, protecting the main program and the backup program of SPI ROM 30.

If the BMC 20 fails to load the main program, and the main program is altered or damaged, the controlling module 16 invokes the backup program from the second block 34, and writes the backup program to the first block 32. The logic controlling unit 10 will notify the BMC 20 to read the main program in the first block 32 of the SPI ROM 30 again.

Therefore, the logic controlling unit 10 can recover the main program of the first block 32 using the backup program of the second block 34 whenever the main program of the first block 32 is not in an original state.

After the damaged main program is repaired, the BMC 20 will read normally the main program in the first block 32 of the SPI ROM 30, the server will be in a normal working state, and the BMC 20 will feed back to the logic controlling unit 10. The controlling module 16 will send the deep sleep command to the SPI ROM 30, to control the SPI ROM 30 to enter the deep sleep mode.

The determining module 14 may determine that a request to update the BMC 20 firmware online is received when the SPI ROM 30 is in the deep sleep mode.

The controlling module 16 unlocks write protection of the main program and the backup program and the SPI ROM 30 exits from the deep sleep mode when the BMC 20 has such request.

The BMC 20 performs an online update of the main program in the first block 32, and notifies the logic controlling unit 10 after completing the update.

The controlling module 16 reads the updated main program from the first block 32 and writes the updated main program as an overwrite to the backup program in the second block 34.

Thereafter, the controlling module 16 sends a deep sleep command to the SPI ROM 30, to control the SPI ROM 30 accordingly.

Figure 3:
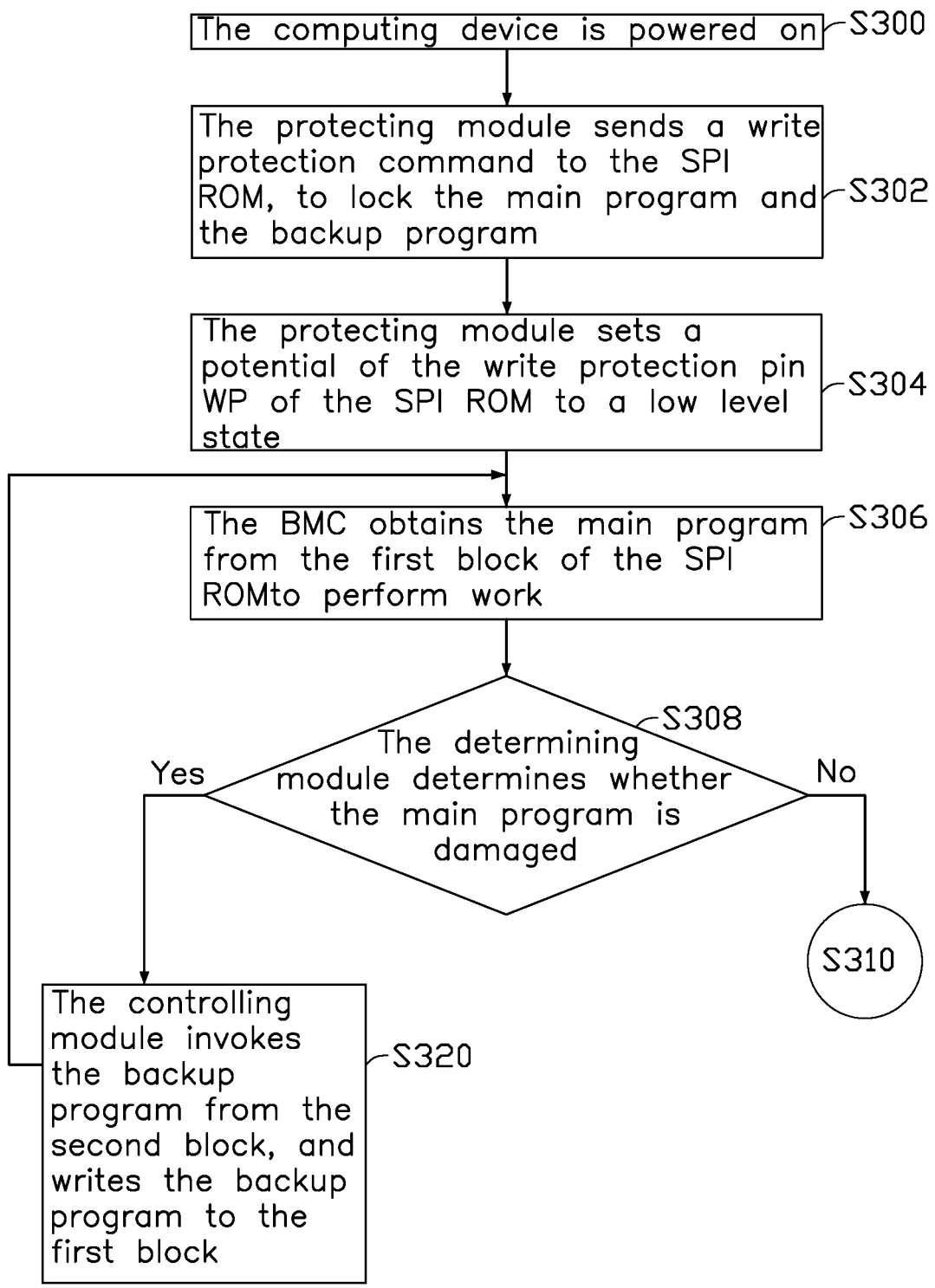
FIGS. 3 and 4 are flowcharts of method for protecting a firmware of the baseboard management controller of the computing device.
Figure 4:
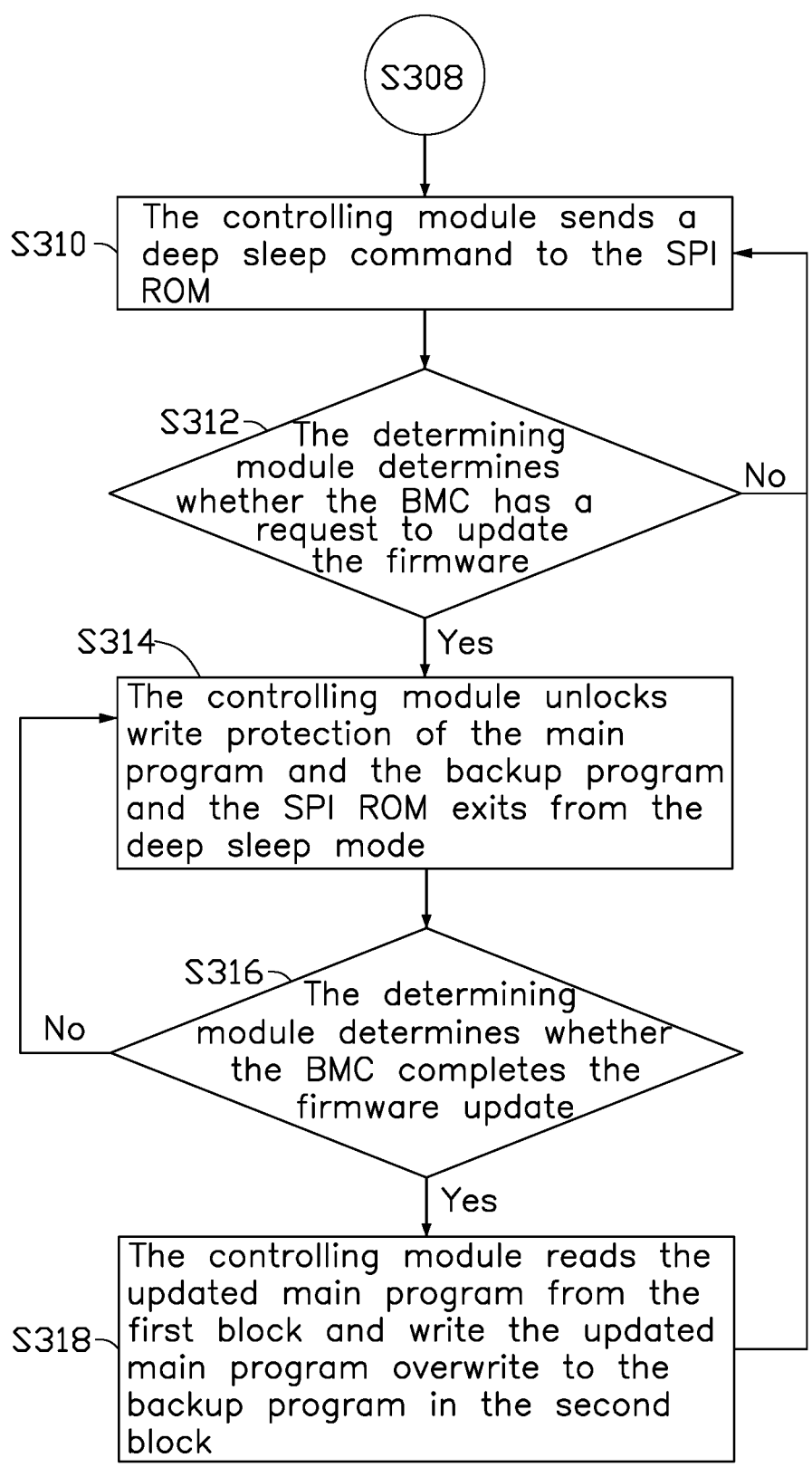

FIGS. 3 and 4 are flowcharts depicting an embodiment of a method to protect firmware of a baseboard management controller. The method is provided by way of example, as there are a variety of ways to carry out the method. The method described below can be carried out using the configurations illustrated in FIGS. 1-2 for example, and various elements of these figures are referenced in explaining the example method. Each block shown in FIGS. 3 and 4 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 300.

At block 300, the computing device is powered on.

In one embodiment, the computing device may be a computer, a server, or other hardware device.

At block 302, the protecting module 12 sends a write protection command to the SPI ROM 30, to lock the main program and the backup program. Therefore, the SPI ROM 30 can only read data, and the main program and the backup program are protected against alteration.

At block 304, the protecting module 12 sets a potential of the write protection pin WP of the SPI ROM 30 to a low level state, to write-protect the main program and the backup program in the SPI ROM 30.

At block 306, the BMC 20 obtains the main program from the first block 32 of the SPI ROM 30 to perform work.

At block 308, the determining module 14 determines whether the main program is altered or damaged when the main program is obtained. If the main program is altered or damaged, block 320 is implemented, otherwise block 310 is implemented.

At block 310, the controlling module 16 sends a deep sleep command to the SPI ROM 30, to control the SPI ROM 30 to enter a deep sleep mode.

For example, when the BMC 20 can successfully load the main program, and the main program is not damaged, the controlling module 16 will send the deep sleep command to the SPI ROM 30, to control the SPI ROM 30 to enter the deep sleep mode. At this time, the SPI ROM 30 cannot be read from or written to, protecting the main program and the backup program of SPI ROM 30.

At block 312, the determining module 14 determines whether that a request to update the BMC 20 firmware online is received. If the BMC 20 has such request to update the firmware online, block 314 is implemented, otherwise returns to block 310.

At block 314, the controlling module 16 unlocks write protection of the main program and the backup program and the SPI ROM 30 exits from the deep sleep mode.

For example, when the BMC 20 needs to perform burning firmware, the controlling module 16 unlocks various protections (such as write protection and deep sleep mode) and feeds this state back to the BMC 20. At this time, the SPI ROM 30 can be written.

At block 316, the determining module 14 determines whether the BMC 20 completes the firmware update. If the BMC 20 has complete the firmware update, block 318 is implemented, otherwise returns to block 314.

At block 318, the controlling module 16 reads the updated main program from the first block 32 and write the updated main program as an overwrite to the backup program in the second block 34.

Thereafter, the controlling module 16 sends a deep sleep command to the SPI ROM 30, to control the SPI ROM 30 accordingly.

At block 320, the controlling module 16 invokes the backup program from the second block 34, and writes the backup program to the first block 32.

In the embodiment, the logic controlling unit 10 will notify the BMC 20 to read the main program in the first block 32 of the SPI ROM 30 again. Therefore, the logic controlling unit 10 can recover the main program of the first block 32 using the backup program of the second block 34 when the main program of the first block 32 is altered or damaged.

Therefore, the firmware protecting system and method can prevent the firmware of the BMC from being vandalized or accidentally altered due to design flaws.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A firmware protecting system of baseboard management controller (BMC) operating in a computing device, and comprising:
   a serial peripheral interface (SPI) ROM communicating with the BMC; wherein the SPI ROM comprises a first block and a second block; the first block stores a main program, and the second block stores backup program; and
   a logic controlling unit communicating between the SPI ROM and the BMC, and comprising:

a protecting module locking the main program and the backup program of the SPI ROM for write protection when the computing device is powered on;

a determining module determining whether the main program of the first block is damaged when the main program is obtained by the BMC; and a controlling module invoking the backup program from the second block, and writing the backup program to the first block when the main program of the first block is determined to be damaged;

wherein the protecting module sends a write protection command to the SPI ROM, and the main program and the backup program are locked according to the write protection command;

wherein the SPI ROM further comprises a write protection pin, and the protecting module sets a potential of the write protection pin of the SPI ROM to a low level state, to lock the main program and the backup program in the SPI ROM for write protection; and in response to locking the main program and the backup program in the SPI ROM, the controlling module sends a deep sleep command to the SPI Rom to control the SPI ROM to enter a deep sleep mode when the main program of the first block is determined to be locked.

2. The firmware protecting system of claim 1, wherein the determining module further determines whether the BMC has a request to update the firmware when the SPI ROM is in the deep sleep mode.

3. The firmware protecting system of claim 2, wherein the controlling module unlocks write protection of the main program and the backup program when the BMC has a request to update the main program of first block.

4. The firmware protecting system of claim 3, wherein the controlling module controls the SPI ROM exit from the deep sleep mode when the BMC has a request to update the main program of first block.

5. The firmware protecting system of claim 4, wherein the determining module determines whether the main program of first block has completed the update, and the controlling module reads the updated main program from the first block and writes the updated main program to the backup program in the second block.

6. The firmware protecting system of claim 1, wherein the logic controlling unit communicates with the SPI ROM through an SPI bus.

7. The firmware protecting system of claim 1, wherein the logic controlling unit is a complex programmable logic device (CPLD).

8. A firmware protecting method of baseboard management controller (BMC) operating in a firmware protecting system, comprising:

locking main program of a first block of a serial peripheral interface (SPI) ROM and backup program of a second block of the SPI ROM for write protection when the firmware protecting system is powered on;

obtaining the main program of the first block of the SPI ROM;

determining whether the main program of the first block is damaged; and invoking the backup program of the second block and writing the backup program to the first block when the main program of the first block is determined to be damaged;

sending a write protection command to the SPI ROM, and the main program and the backup program are locked according to the write protection command; and setting a potential of the write protection pin of the SPI ROM to a low level state, to lock the main program and the backup program in the SPI ROM for write protection; and in response to locking the main program and the backup program in the SPI ROM, the controlling module sends a deep sleep command to the SPI Rom to control the SPI ROM to enter a deep sleep mode when the main program of the first block is determined to be locked.

9. The firmware protecting system of claim 8, wherein further comprising:

determining whether the BMC has a request to update the firmware when the SPI ROM is in the deep sleep mode.

10. The firmware protecting method of claim 9, wherein further comprising:

unlocking write protection of the main program and the backup program when the BMC has a request to update the main program of first block.

11. The firmware protecting method of claim 10, wherein further comprising:

controlling the SPI ROM exit from the deep sleep mode when the BMC has a request to update the main program of first block.

12. The firmware protecting method of claim 11, wherein further comprising: determining whether the main program of first block has completed the update, and reading the updated main program from the first block and writing the updated main program to the backup program in the second block.

* * * * *

UNITED STATES PATENT AND TRADEMARK OFFICE
CERTIFICATE OF CORRECTION

PATENT NO. : 10,824,732 B1
APPLICATION NO. : 16/398752
DATED : November 3, 2020
INVENTOR(S) : Xiao-Long Zhou It is certified that error appears in the above-identified patent and that said Letters Patent is hereby corrected as shown below:

On the Title Page

Please replace item (73) regarding "Assignees" with the following:
(73) HONGFUJIN PRECISION ELECTRONICS(TIANJIN)CO.,LTD., Tianjin (CN)

Signed and Sealed this
Twelfth Day of January, 2021

Andrei Iancu
*Director of the United States Patent and Trademark Office*